United States Patent
Knapp et al.

[15] 3,706,396
[45] Dec. 19, 1972

[54] AGRICULTURAL PLANTING APPARATUS HAVING METERING MEANS

[72] Inventors: Philip B. Knapp, Lynbrook; Jon R. Zogg, Baldwin, both of N.Y.

[73] Assignee: Aptek Industries, Inc., Lynbrook, N.Y.

[22] Filed: July 23, 1970

[21] Appl. No.: 57,440

[52] U.S. Cl. ................................. 221/265, 221/185
[51] Int. Cl. ............................................. B65g 59/00
[58] Field of Search ............... 221/113, 185, 241, 265

[56] References Cited

UNITED STATES PATENTS

| | | | |
|---|---|---|---|
| 2,621,096 | 12/1952 | Broyles et al. | 221/265 X |
| 2,630,245 | 3/1953 | Maier | 221/265 X |
| 3,028,713 | 4/1962 | Kennedy et al. | 221/113 X |
| 3,128,011 | 4/1964 | Bleiman | 221/265 X |
| 3,246,806 | 4/1966 | McBride, Jr. | 221/265 X |
| 2,576,693 | 11/1951 | Oehler | 221/265 |

*Primary Examiner*—Samuel F. Coleman
*Attorney*—Arthur B. Colvin

[57] ABSTRACT

Planting apparatus for use with a powerized vehicle for depositing seed containing pellets in the ground at precisely selected, spaced positions. The apparatus is powered by the linear advance of the vehicle and removes individual pellets from a bulk supply hopper and deposits the same in a discharge chute.

1 Claim, 7 Drawing Figures

PATENTED DEC 19 1972　　　3,706,396

INVENTORS:
PHILIP B. KNAPP
JON R. ZOGG

BY

ATTORNEYS

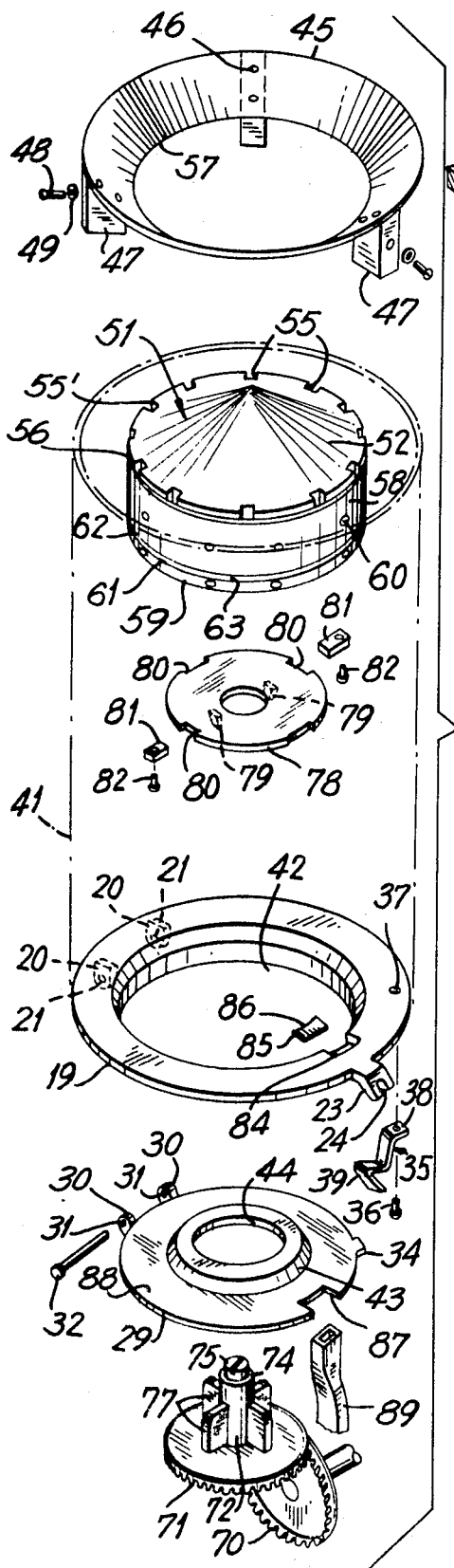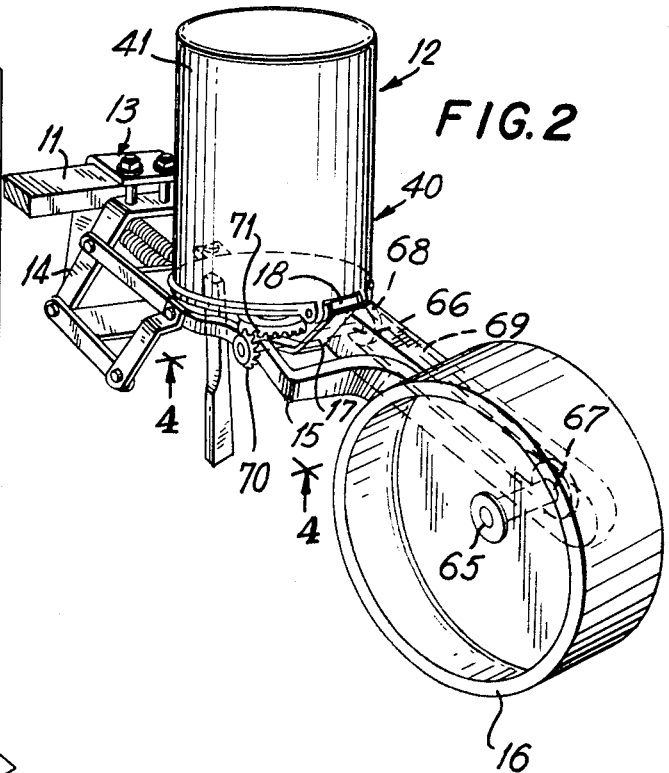

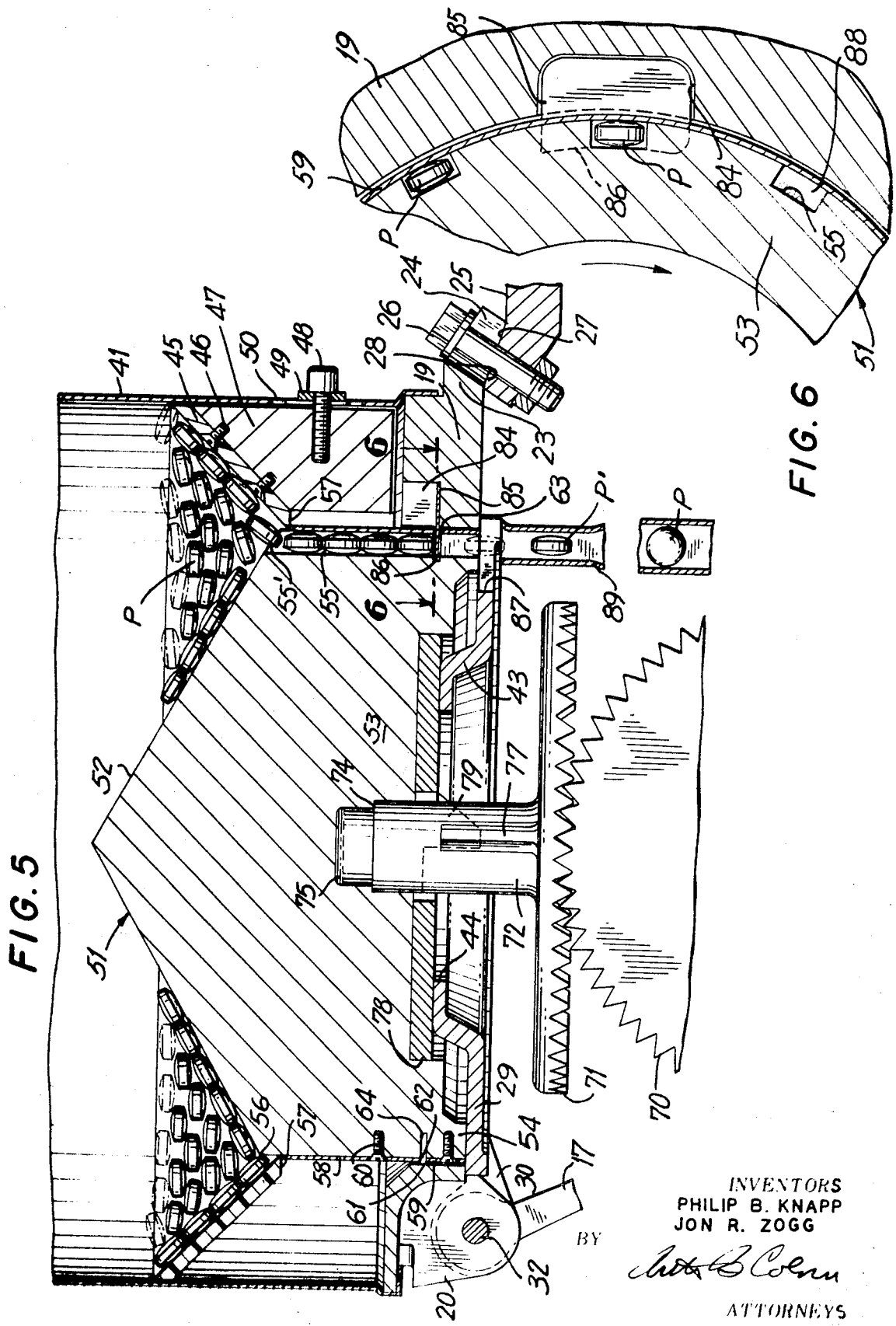

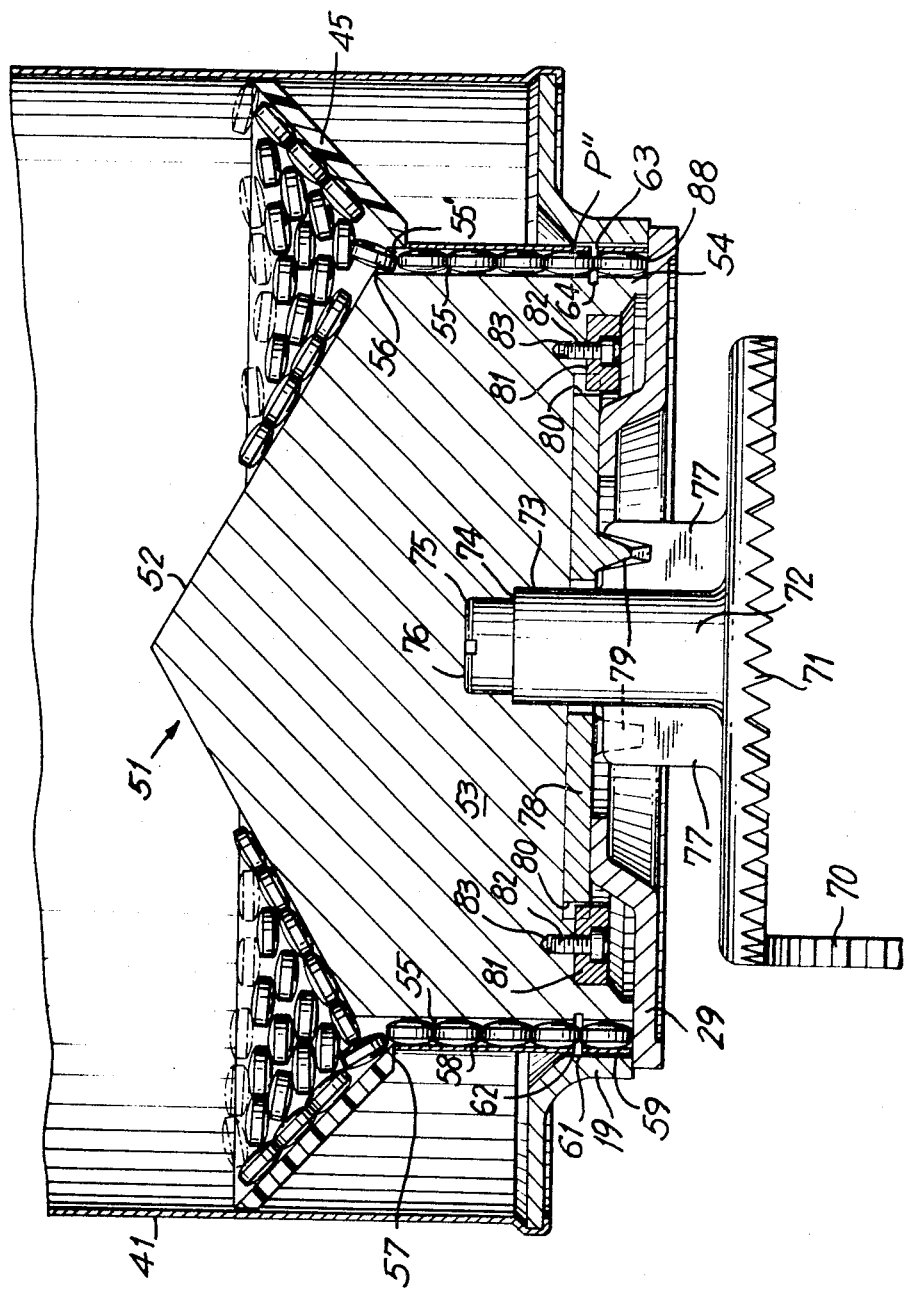

AGRICULTURAL PLANTING APPARATUS HAVING METERING MEANS

As conducive to an understanding of the invention, there is disclosed in my copending application Ser. No. 781,105, filed Dec. 4, 1968 and entitled "Environmental Seed Cell," a seed cell or pellet comprising a seed encased within a mass or charge of environmental material, such as nutriment, etc., which material is calculated to foster proper germination and rapid growth in the initial developmental stages of the plant.

In addition to nurturing growth in the earlier stages, the seed pellet, containing a single seed, prevents overplanting (i.e., the depositing of too many seeds in a given area) and the attendant requirement for subsequent thinning. In short, the seed cell or pellet provides a means for enabling a planter accurately to locate one plant with respect to adjacent plants, with an extremely high germination percentage and initial growth rate.

The present invention relates to a planting apparatus especially intended for use with seed pellets of the type described which will enable the user on a large or commercial scale, automatically to plant the seed pellets in accordance with a predetermined desired spacing.

With the device of the present invention, the planter may scientifically determine the desired spacing and set up the apparatus to correspond therewith, with the assurance that seed pellets from the bulk supply will be regularly distributed without any substantial likelihood of missing a position at which a seed is to be planted or over-planting, i.e., depositing two or more seed pellets at a location intended to accommodate only a single pellet.

SUMMARY OF THE INVENTION

The invention may be summarized as directed to planting apparatus for the automatic distribution of seed pellets. The apparatus is particularly intended to be towed by a vehicle, such as a tractor, one or more such planting apparatuses being drawn by the tractor.

The apparatus includes a bulk supply hopper and a distributor turret, which turret is rotated by a power takeoff which preferably derives its motive force from a friction wheel drawn across the ground. By this arrangement, the distribution pattern or spacing is rendered independent of the absolute speed of the towing vehicle, being dependent instead on the distances traced by the wheel.

The turret includes one or more guide channels for supporting in columnar array a series of seed pellets drawn from the bulk supply hopper. The columns of pellets are sequentially scanned across an opening leading to a distribution or discharge chute, a single pellet being dropped through the opening and chute as each column is scanned thereover.

A metering blade is positioned to intersect the column as the column scans and registers with the opening, so as to prevent other pellets in the column beside the lowermost pellet from falling through the chute.

It is important in apparatus of this sort that the columns be continuously filled since it is obvious that if a column is empty or if the pellets in the column are not free to shift vertically as the same is scanned over the discharge chute, a pellet will not be dropped at a desired location. The blade provides the additional function of agitating the pellets in the columns by vertically oscillating the pellets in the column, to clear any possible jams and to assure that the pellets in a column are permitted to travel freely therein.

Further, the linear spacing of the pellets one from another may be readily varied by providing an apparatus with a multiplicity of columns and plugging or blocking selected ones of the columns where greater spacing is desired, or unblocking and freeing the columns where a closer spacing is desired.

Accordingly, it is an object of the invention to provide feeding mechanism for serially depositing seed pellets at predetermined selected planting intervals.

A further object of the invention is the provision of a device of the type described in which the intervals may be precisely controlled and in which the intervals will be independent of the absolute speed of the towing vehicle or tractor.

A further object of the invention is the provision of a device of the class described in which the seed pellets are arranged in vertical columns and the columns are agitated in a vertical direction, to displace a pellet in the hopper at the column entrance which might otherwise impede the filling of the column and to free any jams which may occur in the columns themselves.

A still further object of the invention is to provide planting apparatus for seed pellets, cells or the like wherein pellets are led from a bulk supply and deposited at predetermined spaced intervals.

In the accompanying drawings in which is shown one of various possible embodiments of the several features of the invention:

FIG. 2 is an enlarged perspective view of a single planting unit, shown in conjunction with suspension apparatus linking the same to the draw bar of a tractor;

FIG. 3 is an exploded isometric view of the parts prior to assembly;

FIG. 5 is a vertical section taken on the line 5—5 of FIG. 4;

FIG. 6 is a magnified sectional view taken on the line 6—6 of FIG. 5; and

FIG. 7 is a vertical section taken on the line 7—7 of FIG. 4.

Figure 1:
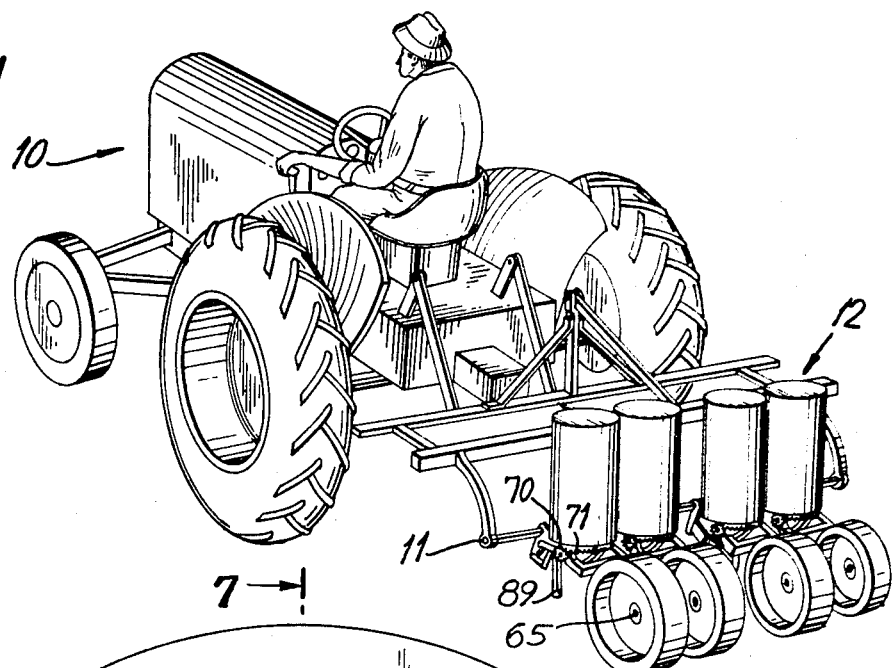
FIG. 1 is a perspective view of a tractor equipped with four planting apparatuses in accordance with the invention.
Figure 4:
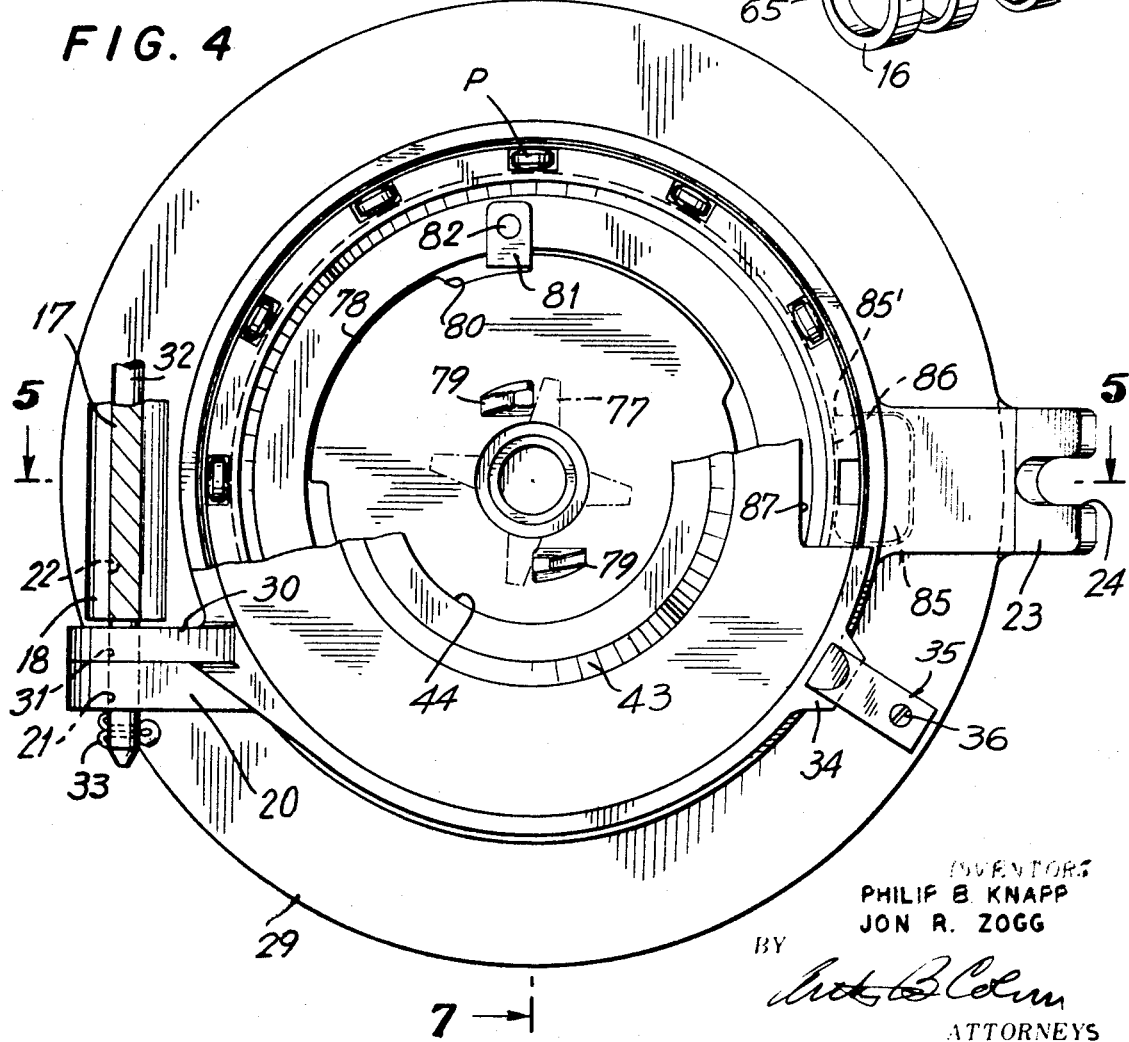
FIG. 4 is a bottom plan view taken in the direction of the arrows 4—4 of FIG. 2, with parts broken away to show details of construction.

Referring now to the drawings, there is shown in FIG. 1 a tractor 10 having a trailing tow bar 11, to which bar are linked the independent planter assemblies 12 (four in number being shown) which are the subject of the present invention.

As best seen in FIG. 2, the transverse spacing of the planters 12 along the bar 11 may be modified by the use of adjustable clamp assemblies 13 which link the planters to the bar. It will be readily appreciated by anyone familiar with agricultural machinery that more or fewer planters may be fixed to the bar, that bars of greater or lesser widths may be employed, etc.

The clamp 13 is connected to a suspension frame 14 of conventional design and not forming any part of the present invention. The suspension frame 14 includes a main strut 15, carrying at its trailing terminal end a traction wheel 16 which wheel, when drawn across the ground, provides motive power for the operation of the planter 12.

The suspension 14 permits an articulation of the strut 15 relative to the draw bar 11 in known manner, to enable the traction wheel to traverse irregularities in the ground surface while still maintaining the wheel in frictional connection with the ground.

The strut 15 and frame assembly 14 fixedly carry a support strut 17, the upper end of which includes a horizontally directed hinge eye member 18.

A hopper base plate or casting 19 includes a pair of depending hinge ears 20,20, which are provided with hinge apertures 21, 21 adapted to align with the transverse aperture 22 in the eye 18.

The hopper base plate 19 is provided with a locking retainer fork 23 at a position substantially diametrically opposite the ears 20, the fork including an access slot 24. The fork 23 is locked to a draw strut 25 forming a forward part of the suspension frame 14, as by a bolt member 26 (see FIG. 5).

The upper surface 27 of the draw strut 25 and the lower surface 28 of the fork 23 are complementally bevelled so as to provide a flush inter-engagement whereby the bolt 26 may clamp the strut to the fork in such manner that these parts are maintained in interfitting engagement.

The connection of the plate 19 to the frame is in all respects conventional and forms no part of the present invention.

A closure disc 29 is maintained beneath the hopper base plate 19, the disc including a pair of hinge ears 30, 30 having transversely directed apertures 31, 31. In the assembled condition, the hinge ears 30, 30 of the closure disc 29 are disposed between the ears 20, 20 of the base plate 19 and outside the eye member 18 of the support strut 17. The parts are pivotally integrated into a hinge structure by a hinge pin 32 which is passed through the apertures 31, 21 and 22 of the ears 30, 20 and the eye 18 respectively, the pin being fixed against transverse retractile movement from the hinge structure by a cotter pin 33.

The closure disc 29 includes a radially extending retainer flange 34. A spring locking finger 35 is secured as with machine screw 36 into an aperture 37 in the base plate 19. The spring member 35 includes a base leg 38 flush mounted against the undersurface of the plate 19 and has at its opposite end a latch leg 39. In the closed position of the apparatus, the latch leg 39 underlaps the flange 34 to lock the closure disc against pivotal movement relative to the plate 19.

From the foregoing description it will be appreciated that when the bolt 26 is loosened and released from the slot 24 in the retainer fork 23, the base plate 19, on which is mounted the hopper assembly 40, may be pivoted about the axis of the hinge pin 32. Similarly, in the pivoted position of the hopper, the retainer spring 35 may be retracted to release the latch leg 39 from under the flange 34, to permit a further pivotal movement of the closure disc relative to the plate 19 about the axis of the said pin 32.

As previously noted, the base plate 19 carries the hopper assembly 40, which assembly includes a container member 41. The container 41 is preferably spun or otherwise interfitted over the periphery of the base plate 19. The base plate 19 incorporates a central aperture 42.

The closure disc 29 includes a raised central frustoconic portion 43 having an interior drive access aperture 44, the frusto-conic portion 43 and drive aperture 44 being formed concentrically as respects the aperture 42 in the base plate.

The hopper assembly 40 includes a floor portion defined in part by an inwardly inclined frusto-conic annulus 45 which optionally but preferably is formed of a plastic material having a low coefficient of friction, such as Teflon or nylon. The annulus 45 is fixed, as by machine screws 46, to three equally spaced mounting blocks 47. The blocks 47 are secured by machine screws 48 and lock washers 49 to the interior of the container 41.

The container 41 is provided with access apertures 50 for the passage therethrough of the machine screws 48, the access apertures 50 preferably being elongated in a vertical direction to provide a degree of vertical adjustability of the blocks 47 and, hence, the inclined annulus skirt 45.

A turret assembly 51 is rotatably mounted in the bottom of the hopper. The turret assembly 51, which is preferably in the form of a solid casting, includes a conical upper portion 52 and a generally cylindrical lower portion 53. The turret 51 includes a depending annular shoulder portion 54 which is slidably seated on or adjacent the closure disc 29.

The side edges of the turret, in the cylindrical portion 53 thereof, include a plurality of outwardly opening, vertically extending milled slots or guide channels 55 which, as will be appreciated from the ensuing description, form receptacles for vertical columns of seed pellets P.

As best seen from FIGS. 5 and 7, the lowermost edge 56 of the conical upper portion 52 of the turret terminates at a point slightly above the lower terminal edge 57 of the plastic annular skirt 45. As seen from the noted figures, this disposition of the parts facilitates the entry of pellets P stored in bulk supply in the hopper into the uppermost ends of the guide channels 55. The trailing edges 55' of the slots 55 also serve to agitate and clear any pellets which may be wedged at the annular loading area adjacent the lower edge of skirt 45.

A pair of annular metal rings 58 and 59 are fixed to the exterior of the cylindrical portion 53 of the turret 51. The upper annular band 58 is secured by machine screws 60 about the periphery of the turret, the axial extent of the band 58 being less than the height of the cylindrical portion 53 of the turret. It will thus be observed that those portions of the band 58 which overlap the channel slots 55 define the outer limits of the said channels or slots.

The lower annular band 59 is of substantially less height or axial dimension than the band 58 and is secured about the periphery of the cylindrical portion 53 of the turret adjacent the lowermost edge thereof.

The upper edge 61 of the lower band 59 is spaced a slight distance below the lower edge 62 of the upper band 58, thus to define an annular access slot 63.

The casting comprising the turret 51 is provided with an annular slot 64 which registers with the slot 63 defined between the two bands 58, 59, for purposes which will appear hereafter.

The turret assembly 51 is driven in a rotary direction within the hopper by means of a power take-off from the traction wheel 16. The traction wheel 16 rotates a drive shaft 65 journalled on the strut 15, for rotation about a horizontal axis. Hopper drive shaft 66 is similarly journalled on the strut 15. The shafts 65 and 66 carry gears 67, 68, respectively, linked by a drive chain 69.

From the foregoing description, it will be seen that as the traction wheel 16 is rotated, a concomitant rotary movement is imparted to the gear 68 and shaft 66.

The shaft 68 carries a turret drive gear 70, having teeth meshing with the teeth of a depending crown gear 71. The crown gear 71 includes a vertically directed stem 72, which stem is received within a complemental cylindrical recess 73 formed in the undersurface of the turret casting 51. It will be understood that the stem 72 is slidably received within the recess 73, the stem including at its uppermost end 74 a spacer screw 75 which is threaded downwardly into the stem. The enlarged head portion of the spacer screw 75 bears against a depending surface 76 forming the lower end of the recess, thus to provide a range of vertical adjustment of the turret 51 with respect to the closure disc 29, in the event that pellets of different heights are to be distributed.

In this connection it will be appreciated that the engagement of the gears 70 and 71 establishes an essentially fixed vertical position for the stem 72 and that an upward or downward adjustment of the screw 75 provides the noted degree of vertical variability from the reference point defined by the inter-engagement of the gears.

The crown gear assembly 71 includes laterally directed drive vanes 77, four in number being shown, which are employed to transmit rotary motion to a drive plate 78 which is floatingly interposed between casting 15 and the frusto-conic portion 43 of the closure disc 29.

The drive plate 78 includes a pair of depending drive teeth or ears 79 which, as best seen from FIG. 7, lie in the path of the vanes 77. Thus, rotary motion of the stem 72 and vanes 77 will induce a concomitant motion in the plate 78 through the medium of the ears 79, while nonetheless permitting (by reason of the vertical overlap of the ears and vanes) a degree of vertical relative movement between the said parts.

The drive plate 78 includes a plurality of drive notches 80 in the periphery thereof. A driving connection is effected between the casting 51 and the drive plate 78 by a pair of keying inserts 81 which are held to the casting 51 by machine screws 82 inserted into complemental, tapped apertures 83 in the casting.

It will be understood that the inserts 81 extend into the notches 80 and provide for a limited vertical movement between the aforesaid plate and casting, while still maintaining a driving connection between the noted parts.

The base plate 19 is provided with a radially directed recess 84, within which is held a metering knife blade 85. The blade 85 is free to float within the recess 84, the radial innermost edge 86 of the blade projecting beyond the recess and into the registering slots 63, 64 in the casting 51. Since the configuration of the blade, in plan, substantially matches the cross sectional configuration of the recess, the blade will remain essentially stationery by reason of its entering into the slots 63 and 64.

It will be appreciated that the recess 84 provides a degree of vertical clearance, to permit a limited movement of the blade in an upward direction.

The operation of the device will be evident from the preceding description.

In use, the hopper container 41 is loaded with pellets or pills P. As the tractor is driven, rotation of the traction wheel is communicated to the gear 70 in the manner previously described, inducing a rotation of the crown gear 71 about a vertical axis. The rotation of the crown gear induces a complemental rotation of the floater drive plate through the interaction of the vanes 77 and ears 79 of the plate.

The plate, in turn, is drivingly connected with the inserts 81, causing the turret assembly to rotate within the hopper.

Pellets or seed cells within the hopper gravitate to the junction between the lowermost edge 57 of the annular skirt 45 and the lowermost edge 56 of the conical portion 52 of the turret casting 51. With rotation of the casting, pellets are progressively received within the vertically directed slots 55 formed in the outer peripheral edge of the casting and fill the said slots in vertical columns, the lowermost pill or pellet of each column riding on an annular track portion 88 adjacent the periphery of the closure disc 29.

As the turret is rotated, the slots 55 are progressively shifted into registry with a discharge opening 87 formed in the closure disc 29, whereupon the lowermost pellet P' falls through the discharge opening 87, which is preferably communicated with a discharge guide chute 89 to assure that the discharged pellet does not deviate in a transverse direction after its discharge (under such influences as wind, etc.).

It will be appreciated that the discharge opening 87 is in vertically spaced but registering relation to a portion of the blade member 85 in the recess 84, the blade including a lead edge 85' downstream of the opening. Since the blade 85 intersects the columns of pellets before said columns are in registry with the discharge aperture 87, it will be appreciated that those pellets in the column located above the lowermost pellet P' will be prevented from flowing through the discharge opening. But the pellet (or pellets) below the blade will fall through the plate 29. Thus, it is assured that only one pellet or pill (or a predetermined selected number) may be expelled from each column as the column scans the discharge opening 87.

The blade 85 serves the further important function of agitating or vertically lifting the pellets above the discharged pellet. This lifting action occurs as a result of an impingement of the edge of the blade against the pellet directly above the discharged pellet P' as each column of pellets is scanned past the blade. As each column passes the blade, the second pellet P" in such column drops clear of the surface of the blade and decends to the track portion 88 in a position to be discharged the next time it scans the discharge opening.

From the foregoing it is clear that the blade serves the double function of assuring that only the lowermost pellet will be released and agitating the pellets in each column, to guard against jams or like interference with regular pellet feed.

It will be observed that the height of the blade within the recess is automatically adjusted in accordance with the vertical adjustment of the turret by the screw 75 since the height of the blade within the recess 84 is controlled by the height of the slots 63, 64 within which the blade rides.

It will accordingly be understood that as the tractor proceeds across the ground, a pellet is released from each planter apparatus in a selected spaced relationship, both laterally (by reason of the sidewise alignment of the planters on the two bar) and longitudinally. As previously explained, the longitudinal spacing is independent of the absolute vehicle speed since the deposit of pellets is a function of the linear distance tracked by the friction wheel 16.

The apparatus may be adjusted to accommodate pellets of different sizes, should this be desired, by raising or lowering the spacing of the turret 51 from the closure disc 29 in the manner hereinabove described. It will be appreciated that if the spacing of the turret and closure disc is increased, the spacing of the blade 85 from the closure disc will likewise be increased and the blade will thus intersect the column at an increased spacing from the closure disc.

The above described height adjustment feature may also be used to plant two or more pellets at each given pass across the discharge opening 87, it being obvious that if the blade 85 intersects a column between the second and third pellets, both the first and second pellets will be permitted to drop through the opening.

Should it be desired to vary the longitudinal spacing between adjacent pellets, it is merely necessary for the user to deploy plugs or stoppers of some form in the upper ends of selected ones of the slots or guideways 55 in the turret. By this means, certain ones of the guide chutes are deactivated and the pellets will be released at increased spacings.

The hinged connection between the various parts enables the same to be readily disassembled for cleaning, reloading, clearing, etc.

From the foregoing it will be evident that by the present invention there is provided a planter device wherein seed pellets or cells may be accurately deposited in a predetermined selected relationship.

The apparatus is flexible in that simple adjustments may be made which will modify the longitudinal spacing, the accommodation of various sizes of pellets and the depositing of a predetermined number of pellets at one location.

The apparatus is of simple yet rugged design, and may be readily adapted for use with existing towing machinery, such as the standard tractor tool bar.

For purposes of compliance with the patent laws, a preferred embodiment of the invention has been illustrated. However, the illustrated embodiment is not to be construed in a limitative sense, and it will be readily recognized that the designs thereof may be varied without departure from the spirit of the invention. The invention is, accordingly, to be broadly construed within the scope of the appended claims.

Having thus described my invention, what I claim as new and desire to secure by Letters Patent of the United States is:

1. A planting apparatus for the planting of seed pellets comprising a bulk hopper, a rotatable distributor turret having an upper surface forming the floor of said hopper, drive means for rotating said turret, at least one vertical guide channel means formed in said turret for receiving pellets from said hopper and supporting them in columnar array, an annular slot formed in said turret intersecting said guide channel means providing radial access to said channel means, a closure disc blocking the lower end of said guide channel means, a discharge opening in said disc positioned to register with said lower end of said channel once during each revolution of said turret, metering blade means in registry with and vertically spaced from said opening extending radially into said slot to intersect said column in said channel for preventing flow of said pellets above said channel means to said opening in said registering position, and means for variably spacing said turret from said closure disc to thus automatically, variably space said blade means from said closure disc, thereby to enable the feeding of pellets of a variety of sizes, or a plurality of pellets.

* * * * *